(12) United States Patent
Ha et al.

(10) Patent No.: US 12,696,073 B2
(45) Date of Patent: Jul. 28, 2026

(54) APPARATUS AND METHOD FOR PROVIDING DATA MEASURED BY USER PLANE FUNCTION IN A WIRELESS COMMUNICATION SYSTEM

(71) Applicant: ELECTRONICS AND TELECOMMUNICATIONS RESEARCH INSTITUTE, Daejeon (KR)

(72) Inventors: Jeoung Lak Ha, Daejeon (KR); Yoo Hwa Kang, Daejeon (KR); Changki Kim, Daejeon (KR); Taesik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 549 days.

(21) Appl. No.: 18/105,378

(22) Filed: Feb. 3, 2023

(65) Prior Publication Data

US 2023/0269574 A1 Aug. 24, 2023

(30) Foreign Application Priority Data

Feb. 4, 2022 (KR) ........................ 10-2022-0015119
Feb. 3, 2023 (KR) ........................ 10-2023-0014682

(51) Int. Cl.
*H04W 8/20* (2009.01)
*H04W 76/11* (2018.01)

(52) U.S. Cl.
CPC .............. *H04W 8/20* (2013.01); *H04W 76/11* (2018.02)

(58) Field of Classification Search
CPC ................................ H04W 76/11; H04W 8/26
See application file for complete search history.

(56) References Cited

U.S. PATENT DOCUMENTS

| 2011/0022720 A1 | 1/2011 | Song et al. |
| 2011/0134927 A1 | 6/2011 | Lee |
| 2019/0116631 A1* | 4/2019 | Talebi Fard .......... H04W 80/10 |

(Continued)

FOREIGN PATENT DOCUMENTS

| KR | 10-1191601 B1 | 10/2012 |
| KR | 10-2019-0135824 A | 12/2019 |

OTHER PUBLICATIONS

3GPP, "3rd Generation Partnership Project; Technical Specification Group Services and System Aspects; Procedures for the 5G System (5GS); Stage 2 (Release 17)", 3GPP Ts 23.502 V17.3.0 (Dec. 2021).

*Primary Examiner* — Fabricio R Murillo Garcia
(74) *Attorney, Agent, or Firm* — LRK PATENT LAW FIRM

(57) ABSTRACT

Provided is an operation method of a user plane function (UPF) in a wireless communication system, the operation method including: obtaining a subscription request message from a network function (NF), the subscription request message including a first identifier; and providing the NF with a subscription response message corresponding to the subscription request message, the subscription response message including a second identifier, wherein the first identifier includes upSeId or a user session identifier that is a session identifier for a user terminal, or both, and the second identifier includes cpSeId or the user session identifier or both.

16 Claims, 17 Drawing Sheets

(56)            References Cited

U.S. PATENT DOCUMENTS

2020/0404733 A1* 12/2020 Hu ......................... H04W 36/00
2021/0385734 A1    12/2021 Keller et al.
2022/0286518 A1*   9/2022 Rajput ................... H04L 67/02
2023/0035694 A1*   2/2023 Ding ................... H04L 12/1407
2023/0037031 A1*   2/2023 Wang ..................... H04L 67/60
2024/0259857 A1*   8/2024 Zhu ....................... H04W 76/11

* cited by examiner

APPARATUS AND METHOD FOR PROVIDING DATA MEASURED BY USER PLANE FUNCTION IN A WIRELESS COMMUNICATION SYSTEM

CROSS REFERENCE TO RELATED APPLICATIONS

The present application claims priority to Korean Patent Application No. 10-2022-0015119, filed Feb. 4, 2022 and Korean Patent Application No. 10-2023-0014682, filed Feb. 3, 2023, the entire contents of which is incorporated herein for all purposes by this reference.

BACKGROUND OF THE INVENTION

1. Field of the Invention

The present disclosure relates to a wireless communication system. More particularly, the present disclosure relates to an apparatus and a method for exposing data measured by a UPF to another device.

2. Description of Related Art

In a mobile communication system, a service-based architecture (SBA) is applied for an independent and reusable modular framework. Each network function (NF) of a 5G network control plane serves as a service consumer or a service provider. A service provider exposes its service, and a service consumer has an authority to access the service may use the service with a service-based interface (SBI).

In a conventional method, data generated from a UPF is collected first by an SMF and the SMF provides the collected data to another network function.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing a UPF that provides an SBI-based exposure service so that data is more efficiently provided without going through an SMF.

According to an embodiment of the present disclosure, there is provided an operation method of a user plane function (UPF) including: obtaining a session establishment request message from a session management function (SMF), the session establishment request message including a first session identifier; providing the SMF with a session establishment response message corresponding to the session establishment request message, the session establishment response message including a second session identifier, wherein the first session identifier and the second session identifier include a user session identifier (PduSessionID and UEID) that is a session identifier for a user terminal.

In addition, the first session identifier may further include a session identifier (cpSeId) assigned by the SMF during session establishment.

In addition, the second session identifier may further include a session identifier (upSeId) assigned by the UPF during session establishment.

In addition, the user session identifier may include an identifier (UEID) of the user terminal, a session identifier (PduSessionID) assigned by the user terminal, a MAC address, an IPv4 address, and an IPv6 address. The identifier (UEID) of the user terminal may represent a user or the user terminal by using a network access identifier (NAI), an international mobile subscriber identity (IMSI), a mobile station integrated system digital network (MSISDN), a subscription permanent identifier (SUPI), a generic public subscription identifier (GPSI), an international mobile equipment identity (IMEI), and a permanent equipment identifier (PEI).

In addition, the operation method may further include: obtaining, from at least one network function (NF), a third message including the user session identifier (PduSessionID and UEID); and identifying the second session identifier matched to the user session identifier in the third message.

In addition, the operation method may further include: obtaining, from the SMF, a subscription request message about matters to be reported; and providing the SMF with a notification service message corresponding to the subscription request message, wherein the notification service message may be provided through a notification URL (uniform resource locator) included in the subscription request message.

According to an embodiment of the present disclosure, there is provided an operation method of a session management function (SMF), the operation method including: providing a session establishment request message to a user plane function (UPF), the session establishment request message including a first session identifier; and receiving, from the UPF, a session establishment response message corresponding to the session establishment request message, the session establishment response message including a second session identifier, wherein the first session identifier includes a user session identifier (PduSessionID and UEID) that is a session identifier for a user terminal.

In addition, the first session identifier may further include a session identifier (cpSeId) assigned by the SMF during session establishment.

In addition, the second session identifier may further include a session identifier (upSeId) assigned by the UPF during session establishment.

In addition, the user session identifier may include an identifier (UEID) of the user terminal and a session identifier (PduSessionID) assigned by the user terminal.

In addition, the operation method may further include providing the second session identifier to at least one network function (NF).

In addition, the operation method may further include: providing, the UPF, with a subscription request message about matters to be reported; and obtaining, from the UPF, a notification service message corresponding to the subscription request message, wherein the notification service message may be provided through a notification URL (uniform resource locator) included in the subscription request message.

According to an embodiment of the present disclosure, there is provided an apparatus for a user plane function (UPF), the apparatus including: a transceiver; and at least one controller operably connected to the transceiver, wherein the at least one controller is configured to obtain a session establishment request message from a session management function (SMF), the session establishment request message including a first session identifier, and provide the SMF with a session establishment response message corresponding to the session establishment request message, the session establishment response message including a second session identifier, wherein the first session identifier includes a user session identifier (PduSessionID and UEID) that is a session identifier for a user terminal.

In addition, the first session identifier may further include a session identifier (cpSeId) assigned by the SMF during session establishment.

In addition, the second session identifier may further include a session identifier (upSeId) assigned by the UPF during session establishment.

In addition, the user session identifier may include an identifier (UEID) of the user terminal and a session identifier (PduSessionID) assigned by the user terminal.

In addition, the at least one controller may be further configured to obtain, from at least one network function (NF), a third message including the user session identifier (PduSessionID and UEID), and identify the second session identifier matched to the user session identifier in the third message.

In addition, the at least one controller may be further configured to obtain, from the SMF, a subscription request message about matters to be reported, and provide the SMF or another NF designated by the SMF with a notification service message corresponding to the subscription request message, wherein the notification service message may be provided through a notification URL (uniform resource locator) included in the subscription request message.

According to an embodiment of the present disclosure, there is provided an apparatus for a session management function (SMF), the apparatus including: a transceiver; and at least one controller operably connected to the transceiver, wherein the at least one controller is configured to provide a session establishment request message to a user plane function (UPF), the session establishment request message including a first session identifier, and receive, from the UPF, a session establishment response message corresponding to the session establishment request message, the session establishment response message including a second session identifier, wherein the first session identifier includes a user session identifier (PduSessionID and UEID) that is a session identifier for a user terminal.

In addition, the first session identifier may further include a session identifier (cpSeId) assigned by the SMF during session establishment.

In addition, the second session identifier may further include a session identifier (upSeId) assigned by the UPF during session establishment.

In addition, the user session identifier may include an identifier (UEID) of the user terminal and a session identifier (PduSessionID) assigned by the user terminal.

In addition, the at least one controller may be further configured to provide the second session identifier to at least one network function (NF).

In addition, the at least one controller may be further configured to provide the UPF with a subscription request message about matters to be reported, and obtain, from the UPF, a notification service message corresponding to the subscription request message, wherein the notification service message may be provided through a notification URL (uniform resource locator) included in the subscription request message.

According to the present disclosure, a UPF provides an SBI-based exposure service, so that data can be more efficiently provided without going through an SMF.

According to the present disclosure, an SBI-based exposure service is applied to a UPF, so that various network functions of a 5G system can obtain data of the UPF directly through a consistent interface.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
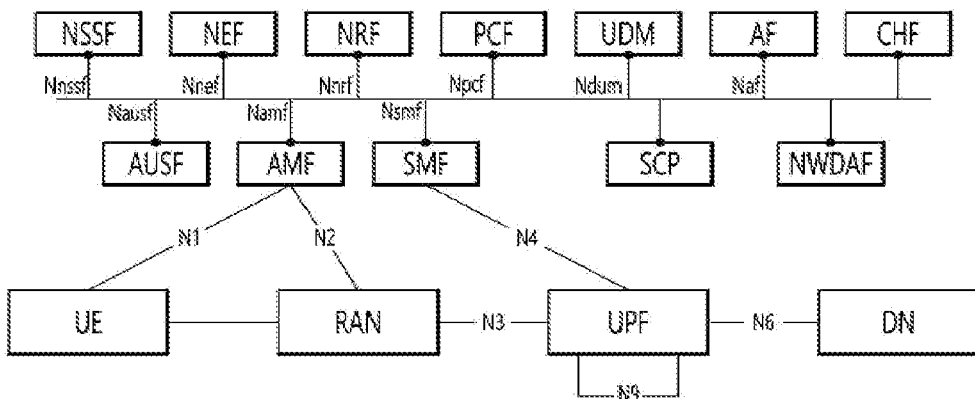
FIG. 1 is a diagram illustrating a conventional wireless network architecture according to a service-based architecture.

The expression "according to some embodiments" or "according to an embodiment" used throughout the specification does not necessarily indicate the same embodiment.

Some embodiments of the present disclosure may be described into functional block components and various processing steps. Some or all of the functional blocks may be realized as any number of hardware and/or software components performing specific functions. For example, functional blocks of the present disclosure may be realized by one or more microprocessors or by circuit components for a predetermined function. In addition, for example, the functional blocks of the present disclosure may be realized in various programing or scripting languages. The functional blocks may be realized as an algorithm running on one or more processors. In addition, the present disclosure may employ conventional techniques for electronic environment setting, signal processing, and/or data processing. The terms "mechanism", "element", "means", and "component" may be widely used, and are not limited to mechanical and physical components.

Furthermore, connecting lines or connecting members between constituent elements shown in the drawings are merely illustrative of functional connections and/or physical or circuit connections. Connections between constituent elements may be represented by various alternative or additional functional connections, physical connections, or circuit connections in a practical device.

FIG. 1 is a diagram illustrating a conventional wireless network architecture according to a service-based architecture.

Referring to FIG. 1, network functions (NFs), such as a network slice selection function (NSSF), a network exposure function (NEF), an NF repository function (NRF), a policy control function (PCF), unified data management (UDM), an application function (AF), an authentication server function (AUSF), an access and mobility management function (AMF), a session management function (SMF), etc., interface with each other using a service-based interface.

A user plane function (UPF) is a function of handling user data traffic, and transmits user traffic data between a radio access network (RAN) and a data network (DN), and measures the performance of user traffic. The UPF measures path delay between the RAN and the UPF, and path delay and jitter of a user traffic QoS flow. The UPF measures path delay for each of the uplink/downlink/both of a GTP-U path, measures path delay for each of the uplink/downlink/both of a QoS flow, and measures jitter for uplink/downlink QoS flow.

The session management function (SMF) manages user sessions and transfer control of the user sessions to the UPF, so that the UPF can handle user traffic. The SMF matches, for management, sessions managed by the SMF to sessions managed by the UPF, and controls the operation of the UPF.

The policy control function (PCF) is in charge of a policy of a service and transmits policy information to other network functions, such as the SMF, etc. so that the policy can be executed. The application function (AF) is in charge of policies for individual services and transmits the policies to other network functions, such as the PCF, etc. so that the policies can influence traffic handling. The network exposure function (NEF) provides an API of a wireless network to the outside, so that an extended service using a wireless network service can be created from the outside. The charging function (CHF) is in charge of charging and performs charging based on user data usage dealt with by the UPF. A network data analytics function (NWDAF) collects and analyzes data of each of network elements including the UPF, so that efficient operation of the entire network can be achieved.

Figure 2:
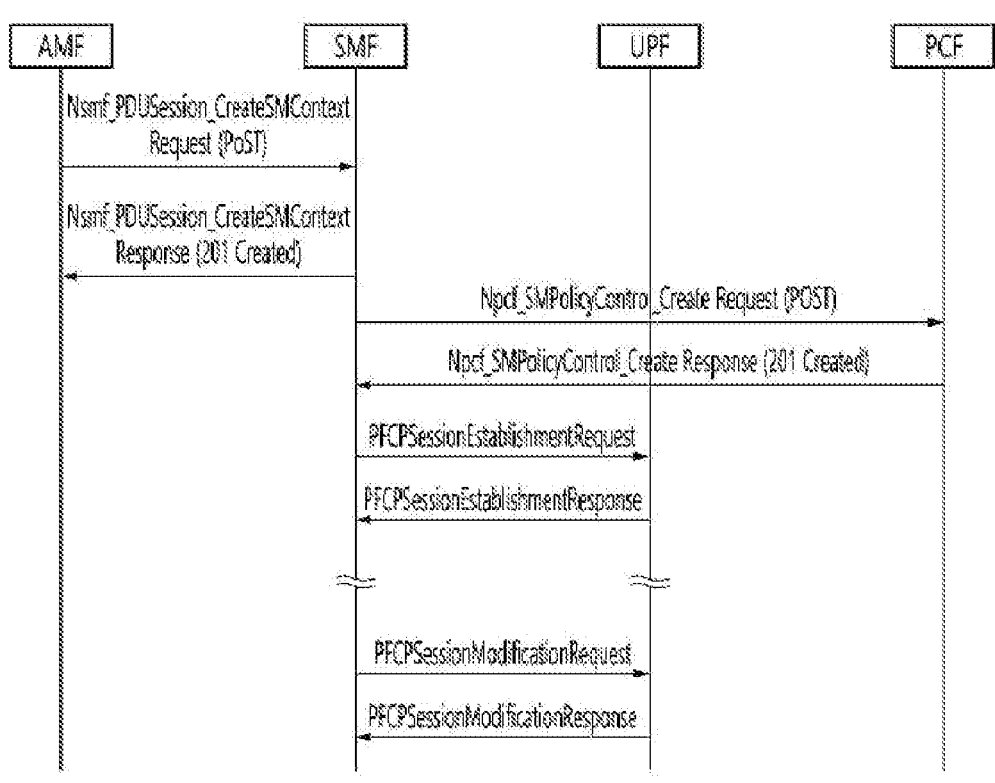
FIG. 2 is a diagram illustrating a process of creating and modify a session on a UPF in a conventional wireless network architecture.

FIG. 2 is a diagram illustrating a process of creating and modify a session on a UPF in a conventional wireless network architecture.

The SMF that has received a session establishment request from the AMF inquires of the PCF about a policy, and requests the UPF to establish a session according to the received policy. As a session identifier for the same session, the AMF or PCF and a UE that has requested a session use PduSessionId together. However, the SMF and the UPF use cpSeId and upSeId, respectively. To this end, during session establishment, the SMF notifies the UPF of cpSeId assigned by the SMF and receives upSeId assigned by the UPF from the UPF. The UPF receives cpSeId from the SMF and provides upSeId, so that cpSeId and upSeId are shared between the UPF and the SMF. Regarding a session modification process to be performed afterwards, when the SMF makes a request to the UPF, upSeId is provided as an identifier, or when the UPF makes a request to the SMF, cpSeId is provided as an identifier. In addition, cpSeId and upSeId are applied equally to a session deletion (not shown) process, and cpSeId and upSeId are also applied equally to a report process, which will be described with reference to FIG. 3.

A session identifier used for each network function is shown in Table 1 below.

TABLE 1

| Network function | Session identifier | Remarks |
|---|---|---|
| SMF | UEID, PduSessionID, cpSeId, upSeId | SMF assigns cpSeId |
| UPF | upSeId, cpSeId | UPF assigns upSeId |
| Other NFs (AMF, PCF, etc.) | UEID, PduSessionID | PduSessionID is unique within UE, so it is used with UEID |

The UPF may obtain a session establishment request message from the SMF. Herein, the session establishment request message may include a first session identifier.

The UPF may provide the SMF with a session establishment response message corresponding to the session establishment request message. Herein, the session establishment response message may include a second session identifier.

The first session identifier may include a user session identifier, which is a session identifier for a user terminal. The first session identifier may further include a session identifier (cpSeId) assigned by the SMF during session establishment. The second session identifier may include a session identifier (upSeId) assigned by the UPF during session establishment. Herein, the user session identifier may include PduSessionID and UEID.

Figure 3:
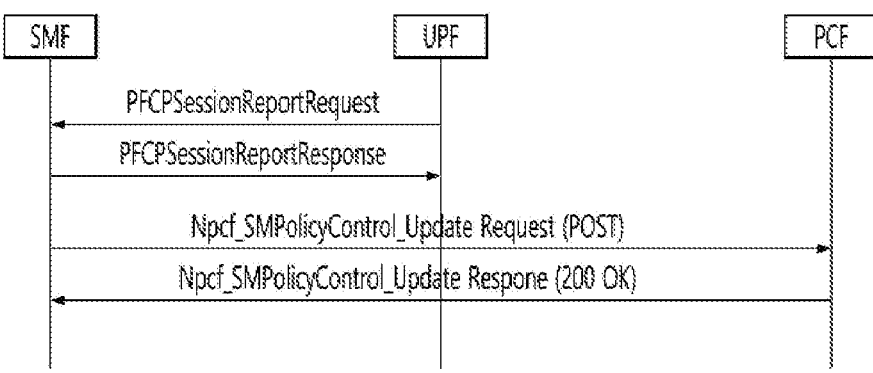
FIG. 3 is a diagram illustrating a process in which a UPF reports on a session to an SMF in a conventional network architecture.

FIG. 3 is a diagram illustrating a process in which a UPF reports on a session to an SMF in a conventional network architecture.

After the session establishment process or session modification process shown in FIG. 2, the UPF that has received a request for a report on a session from the SMF reports to the SMF when matters to be reported occur, and the SMF reports the reported matters to the PCF, etc. The UPF may use cpSeId as a session identifier when reporting to the SMF.

Figure 4:
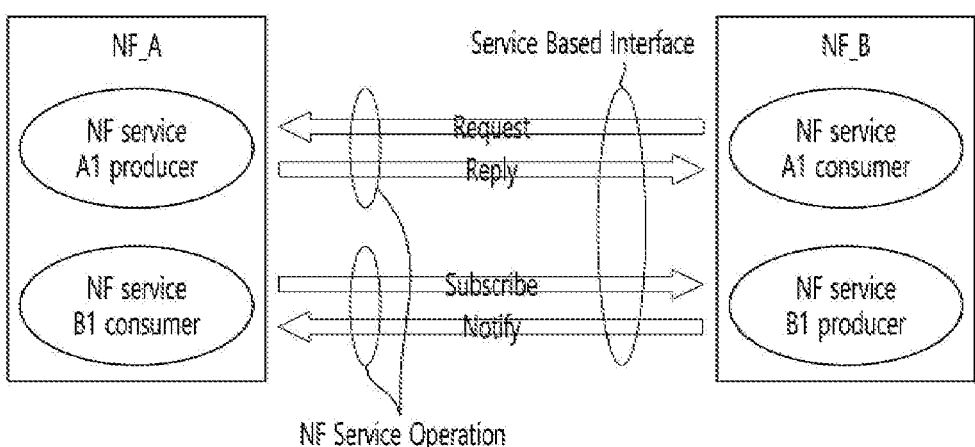
FIG. 4 is a configuration diagram illustrating a service-based interface (SBI) according to an embodiment of the present disclosure.

FIG. 4 is a configuration diagram illustrating a service-based interface (SBI) according to an embodiment of the present disclosure.

Each of the NFs, such as the NSSF, NEF, NRF, PCF, UDM, AF, AUSF, AMF, SMF, CHF, NWDAF, etc., shown in FIG. 1 may mutually use the service operation shown in FIG. 4. NF_B, a consumer of service A1, may make a request to NF_A providing the service A1 for the service and may receive a response. In addition, NF_A, a consumer of service B1, may subscribe to the service from NF_B, a service provider of the service B1. When an event to which NF_A has subscribed occurs in the service, NF_B provides a notification to NF_A.

Figure 5:
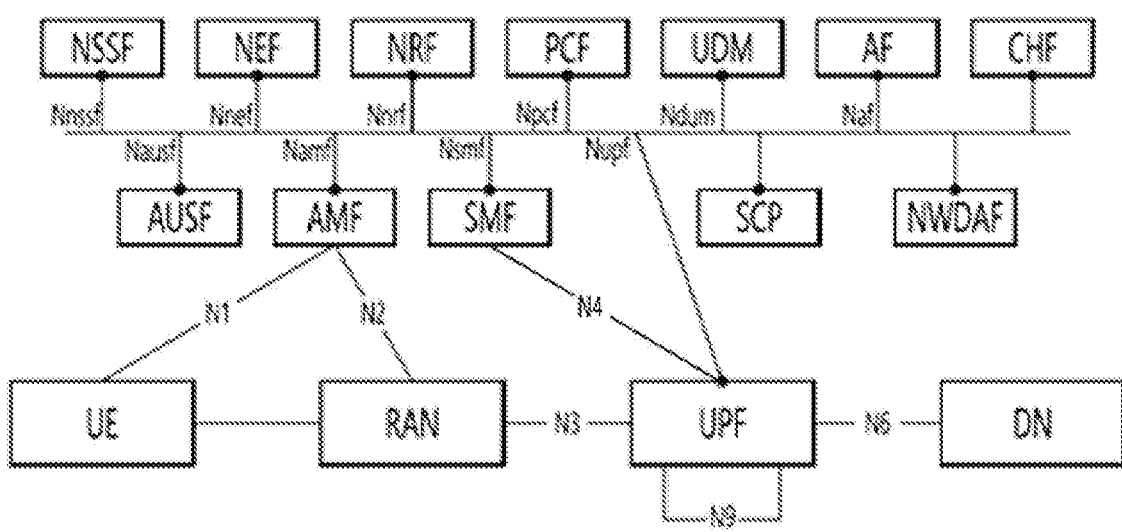
FIG. 5 is a diagram illustrating a network architecture according to an embodiment of the present disclosure.

FIG. 5 is a diagram illustrating a network architecture according to an embodiment of the present disclosure.

Referring to FIG. 5, a network architecture according to an embodiment of the present disclosure may be realized by applying an SBI to a UPF of a conventional wireless network architecture. Accordingly, the UPF may provide and receive a service through a service-based interface in the manner described with reference to FIG. 4. The UPF may register its service on an NRF, may make a query to the NRF about an NF providing a service that the UPF will use, may receive a response to the query, and may use the SBI to make a request to the NF for the desired service.

Figure 6:
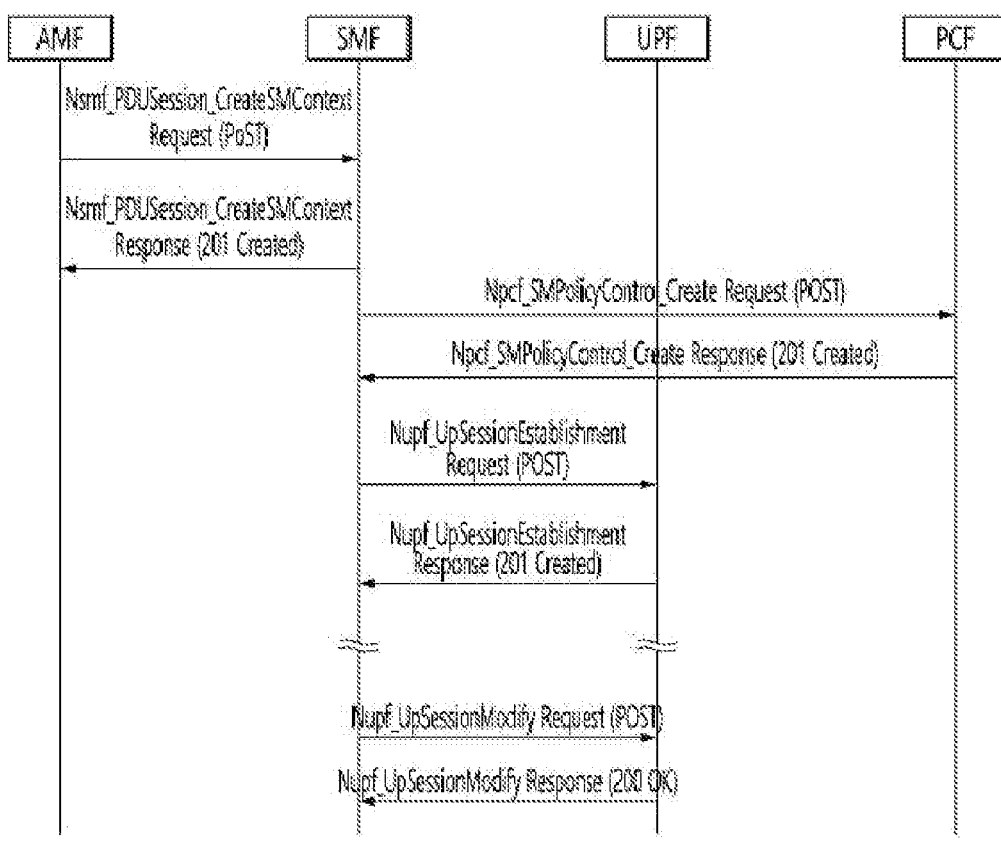
FIG. 6 is a diagram illustrating a process of creating and modify a session on a UPF in a UPF structure to which an SBI is applied, according to an embodiment of the present disclosure.

FIG. 6 is a diagram illustrating a process of creating and modify a session on a UPF in a UPF structure to which an SBI is applied, according to an embodiment of the present disclosure.

The function of the process is the same as that described above with reference to FIG. 2. In FIG. 2, the SMF provides the UPF with cpSeId as a session identifier. However, according to the present disclosure, during a process of establishing a session on the UPF by the SMF, the SMF may further provide the UPF with UEID and PduSessionID in addition tocpSeId. Afterward, when a device, such as the PCF, provides UEID and PduSessionID as an identifier with respect to the session on the UPF, the UPF may refer to upSeId from UEID and PduSessionID.

Figure 7:
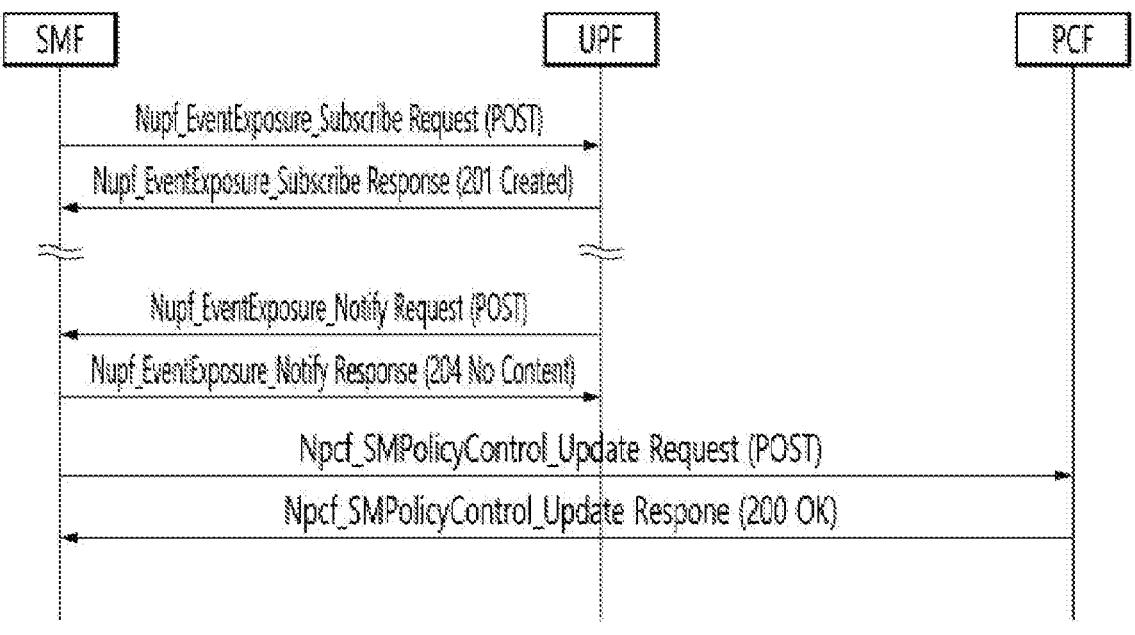
FIG. 7 is a diagram illustrating a process in which a UPF reports on a session to an SMF in a UPF structure to which an SBI is applied, according to an embodiment of the present disclosure.

FIG. 7 is a diagram illustrating a process in which a UPF reports on a session to an SMF in a UPF structure to which an SBI is applied, according to an embodiment of the present disclosure.

FIG. 3 illustrates the operation in which the UPF provides the SMF with the report matters requested by the SMF during the session establishment process. However, referring to FIG. 7, the SMF makes a request to the UPF for subscription with respect to matters to be reported about a session, and when the report matters for which the request for subscription has made occur in the UPF, the report matters may be provided through a notification service to the SMF or another NF designated by the SMF. Herein, in the process in which the SMF makes the request to the UPF for subscription, the process Nupf_EventExposure_Subscribe Request/Response may be replaced with PFCPSession-EstablishmentRequest/Response or PFCPSessionModifica-tionRequest/Response shown in FIG. 2, or Nupf_UpSes-sionEstablishmentRequest/Response or Nupf_UpSessionModifyRequest/Response shown in FIG. 6.

Herein, the notification service may be provided through NotificationUri that is provided when the SMF makes the request to the UPF for subscription. The subscription request and the notification service may include at least one selected from the group of cpSeId, UEID, and PduSessionID as an identifier for a session. This will be described later with reference to FIG. 12. In addition, FIG. 3 illustrates an operation in which the UPF reports to the SMF by using cpSeId.

Figure 8:
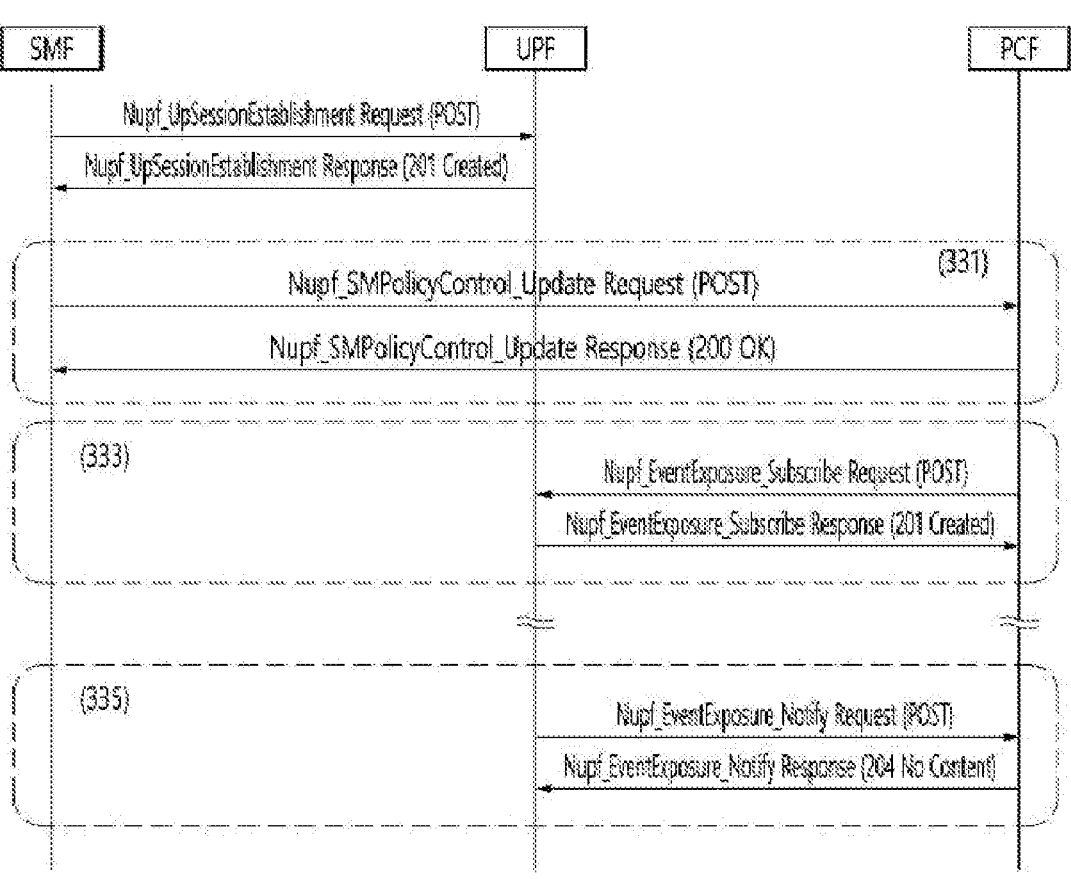
FIG. 8 is a diagram illustrating a process in which a UPF reports on a session to a network function, such as a PCF, rather than an SMF in a UPF structure to which an SBI of FIG. 5 is applied.

FIG. 8 is a diagram illustrating a process in which a UPF reports on a session to a network function, such as a PCF, rather than an SMF in a UPF structure to which an SBI of FIG. 5 is applied.

In FIG. 7, when the SMF makes the request to the UPF for subscription, a combination of cpSeId/upSeId may be used as an identifier for a session. However, as shown in FIG. 8, in order for the PCF, which is a network function that does not directly control the UPF, to make a request to the UPF for subscription, the SMF provides the UPF with UEID and PduSessionID in addition to cpSeId as shown in FIG. 6. When the PCF makes a request to the UPF for subscription, a session may be identified with UEID and PduSessionID and a report on data of the session may be requested. Herein, the PCF provides NotificationUri together through which the report is to be received, so that the report can be received through NotificationUri. This will be described later with reference to FIG. 12.

In the meantime, when the SMF provides the PCF at stage 331 with upSeId received in the process of establishing the session on the UPF, the UPF is capable of identifying the session even though the PCF uses upSeId when the request to the UPF for subscription is made. This is more incov-enient in terms of signaling compared to using both UEID and PduSessionID, but is advantageous to manage a session identifier within the UPF. At stage 331, processes described with reference to FIGS. 9 and 10 may be used. Stage 333 will be described later with reference to FIG. 12. Stage 335 will be described later with reference to FIG. 15.

Figure 9:
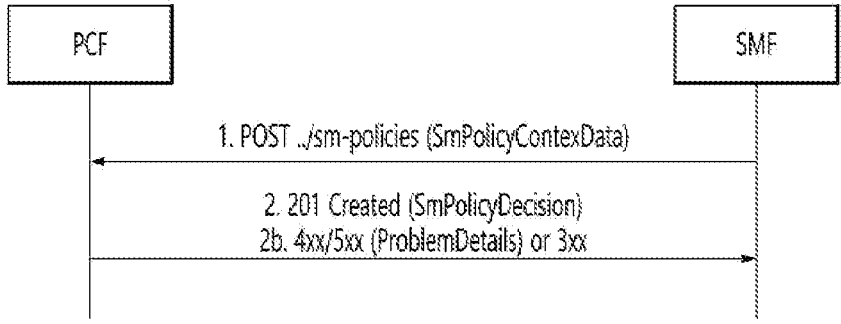
FIG. 9 is a diagram illustrating an example in which an SMF uses service Npcf_SMPolicyControl_Create to make a request to a PCF for a policy for a session to create, according to an embodiment of the present disclosure.

FIG. 9 is a diagram illustrating an example in which an SMF uses service Npcf_SMPolicyControl_Create to make a request to a PCF for a policy for a session to create, according to an embodiment of the present disclosure. This is a method of obtaining {smPolicyId} required for a session policy modification process shown in FIG. 10.

The SMF, a user of service Npcf_SMPolicyControl_Cre-ate, may make a request to the PCF for a policy for a user session. SmPolicyContextData may include UEID and PduSessionID. The PCF creates the requested policy for the session and returns the same as SMPolicyDecision, wherein {smPolicyId} is included in the HTTP Location header. The SMF may use {smPolicyId} when requesting modification/deletion of the session.

Figure 10:
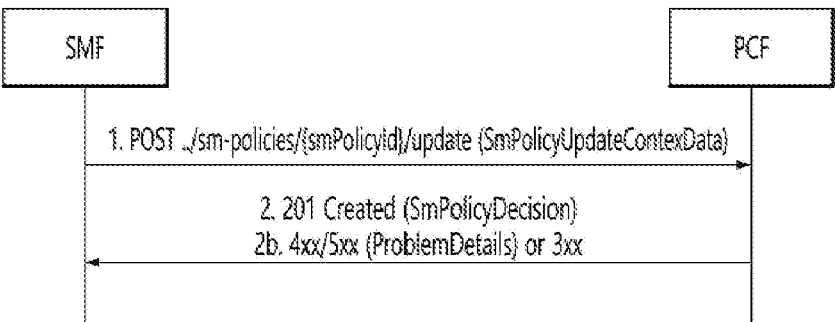
FIG. 10 is a diagram illustrating an example in which an SMF uses service Npcf_SMPolicyControl_Update to make a request to a UPF for modification of a policy for a session, according to an embodiment of the present disclosure.

FIG. 10 is a diagram illustrating an example in which an SMF uses service Npcf_SMPolicyControl_Update to make a request to a UPF for modification of a policy for a session, according to an embodiment of the present disclosure.

The SMF may perform access with {smPolicyId}/update by using {smPolicyId} received in response to Npcf_SM-PolicyControl_Create shown in FIG. 9, and may request modification of the policy. Fr one session, a UE may perform identification with PduSessionID, the UPF may perform identification with upSeId, the SMF may perform identifi-cation with cpSeId, and the PCF may perform identification with a combination of UEID and PduSessionID.

In a related art, an SMF and a UPF may manage upSeId and cpSeId together, and may provide cpSeId as an identifier to the SMF. The SMF may manage cpSeId, upSeId, UEID, and PduSessionID togehter, may provide upSeId as an identifier to the UPF, and may access the PCF with {smPoli-cyId} received after UEID and PduSessionID are provided.

In the present disclosure, the SMF provides the PCF with both an identifier of the UPF that is servicing a session and upSeId, so that the PCF can use upSeId as a session identifier when making a request directly to the UPF for information on the session. Alternatively, as described above with reference to FIG. 2, during a process of establishing/modifying a session on the UPF by the SMF, the SMF provides the UPF with UEID and PduSessionID in addition to cpSeId, so that a device, such as the PCF, allows the UPF to use UEID and PduSessionID as a session identifier.

Figure 11:
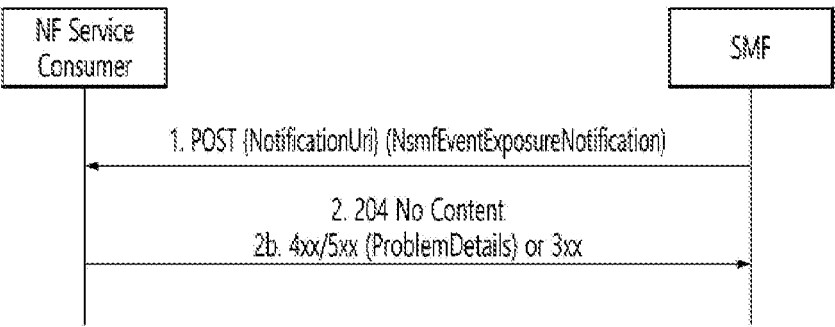
FIG. 11 is a diagram illustrating an example in which an SMF uses service Nsmf_EventExposure_Notify to transmit received measurement information of a UPF to other network functions, according to an embodiment of the present disclosure.

FIG. 11 is a diagram illustrating an example in which an SMF uses service Nsmf_EventExposure_Notify to transmit received measurement information of a UPF to other network functions, according to an embodiment of the present disclosure.

The SMF may receive requests for subscription from the PCF, AF, NWDAF, NEF, CHF, etc., may make a request to the UPF for data based on the requests, may receive the data, and may provide a notification service to the network functions that have requested subscription. That is, the SMF may provide data reported from the UPF as shown in FIG. 3, and may provide the notification service to the network functions from which the SMF has received the requests for subscription.

Figure 12:
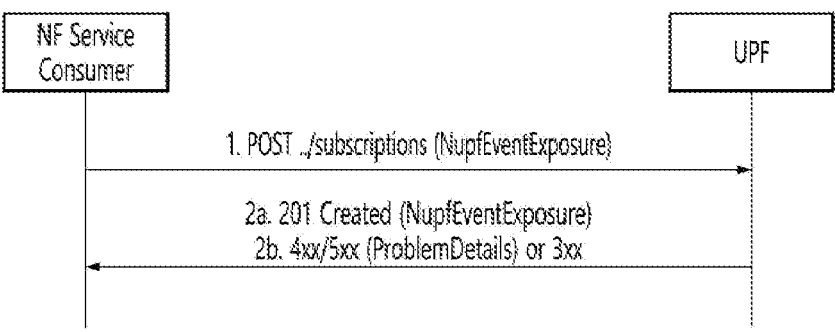
FIG. 12 is a diagram illustrating an example in which in order to use an exposure service of a UPF, other network functions make a request to the UPF for subscription, according to an embodiment of the present disclosure.

FIG. 12 is a diagram illustrating an example in which in order to use an exposure service of a UPF, other network functions make a request to the UPF for subscription, according to an embodiment of the present disclosure.

In FIGS. 7 and 8, the SMF and the PCF are exemplified as network functions that make a request to the UPF for subscription, but the AF, NWDAF, NEF, CHF, etc. may also require measurement data of the UPF. The AF may make a request to the UPF for subscription so as to collect data for transfer performance of application data that the AF provides. The NWDAF may make a request to the UPF for subscription so as to collect data for overall data processing performance of a network. The NEF may make a request to the UPF for subscription so as to collect data for a processing function or performance of data of interest outside the network. The CHF may make a request to the UPF for subscription so as to collect data for charging a user.

A network function that requires the measurement data of the UPF may make a request to the UPF for subscription, wherein subscription matters are included in NupfEventExposure. The UPF may receive the request for subscription and make a response thereto, the response including NupfEventExposure. In addition, by returning {apiRoot}/nsmf-event-exposure/v1/subscriptions/{subId} including {subId} (=subscription ID) in the HTTP Location header, the request for subscription in the future may be managed. A network function requesting subscription may include at least one identifier selected from the group of UEID, PduSessionID, and upSeId to subscribe to when a request for subscription is made, and may include an event to subscribe to, in NupfEventExposure. Herein, a network function requesting subscription may include NotificationUri for receiving a notification service, in NupfEventExposure. NotificationUri for receiving the notification service may be a consumer NF requesting subscription or another NF designated by a consumer NF.

Figure 13:
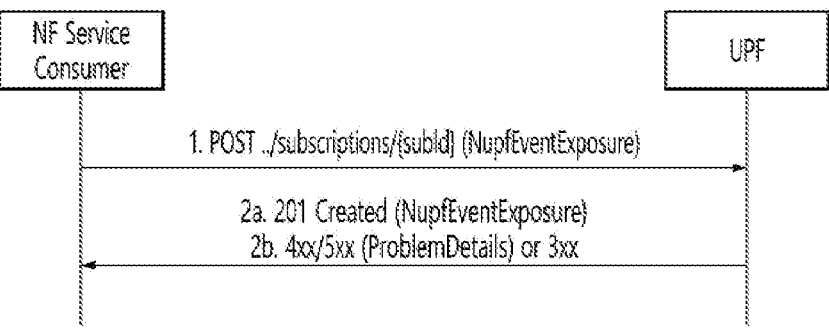
FIG. 13 is a diagram illustrating an example of modifying a request for subscription to data of a UPF, according to an embodiment of the present disclosure.

FIG. 13 is a diagram illustrating an example of modifying a request for subscription to data of a UPF, according to an embodiment of the present disclosure.

When a network function that has already completed a request to the UPF for subscription requires modification of the subscription request, the subscription is modified with the URI including {subId} received when the subscription request is made as shown in FIG. 12, and details to be modified may be included in NupfEventExposure.

Figure 14:
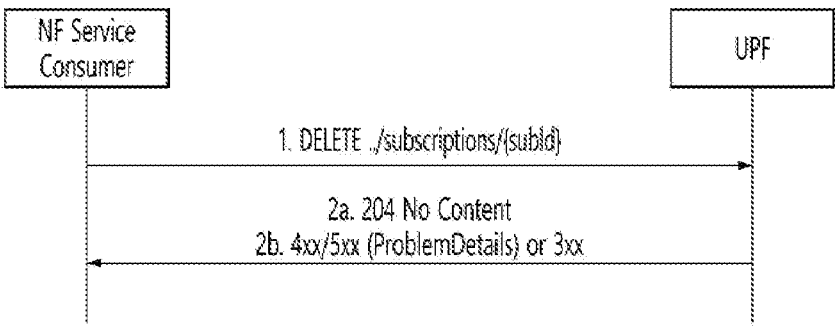
FIG. 14 is a diagram illustrating an example of releasing a request for subscription to data of a UPF, according to an embodiment of the present disclosure.

FIG. 14 is a diagram illustrating an example of releasing a request for subscription to data of a UPF, according to an embodiment of the present disclosure.

When a network function that has completed a request to the UPF for subscription releases the subscription request, the subscription may be released with the URI including {subId} received when the subscription request is made as shown in FIG. 12.

Figure 15:
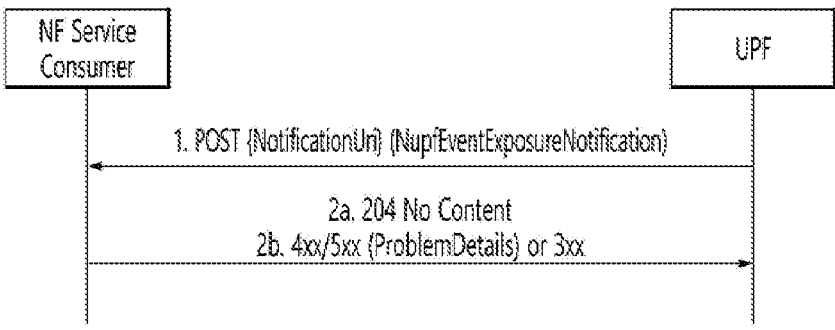
FIG. 15 is a diagram illustrating an example in which a UPF provides a notification service to a network function that has requested subscription to data of a UPF, according to an embodiment of the present disclosure.

FIG. 15 is a diagram illustrating an example in which a UPF provides a notification service to a network function that has requested subscription to data of a UPF, according to an embodiment of the present disclosure.

The UPF may provide a network function from which a request for subscription is received, with a notification service for a subscription service requested by the network function. The notification service may be provided through {NotificationUri} that the UPF has received when a subscription request/modification is made as shown in FIGS. 12 and 13, and notification details may be included in NupfE-ventExposureNotificaiton.

NupfEventExposure used when another network function within the network makes a request to the UPF for subscription and when the UPF provides a response thereto as shown in FIGS. 12 and 13 may include information elements such as the examples below.

| NupfEventExposure | |
|---|---|
| Attribute | Explanation |
| UEID | ID of UE (using SUPI, GPSI, etc.) |
| pduSeId | PDU Session ID = PduSessionID |
| upSeId | Session identifier of UPF |
| subId | Subscription ID |
| notifId | Notification correlation ID |
| notifUri | URI through which notification is to be received = NotificationUri |
| eventSubs | Pieces of event information to subscribe to [EventSubscription] |
| Qfi | Identifier of QoS flow corresponding to subscribed event |
| dnn | Data network name corresponding to subscribed event |
| snssai | Network slice identifier corresponding to subscribed event |
| Application id | Application identifier corresponding to subscribed event |
| Packet filter | Filter capable of detecting QoS flow corresponding to subscribed event |
| expiry | Implied end time of subscription |

Each network function making a request to a UPF for subscription may include an identifier or session identifier of a UE, a session identifier of the UPF, requirements for usage measurement, requirements for performance measurement, etc. with respect to required data.

UEID, pduSeId, and upSeId denote a UE or a session to which a subscription request and a response are provided. upSeId is a session identifier of a UPF, and upSeId and (UEID, pduSeId) has have a 1:1 relation.

subId may be assigned by a UPF providing a subscription service with the same value as {subId} included in the location header of FIG. 12.

notifId is assigned by a side requesting subscription so that a subscription request and a response are provided. A UPF may notify of a relation with a subscription request by providing the same notifId during a notification service later.

notifUri is assigned by a side requesting subscription and notifies a UPF when subscription is requested. Later, the UPF may provide a notification service with the {notifUri}.

eventSubs denotes an event for which a subscription request is made. The form of a list may be provided so that a subscription request can be made for one or more events simultaneously.

Qfi denotes an identifier of a QoS flow for a subscribed event.

Dnn denotes a data network name for a subscribed event.

Snssai denotes an identifier for a subscribed network slice. (Single Network Slice Selection Assistance Information)

Application id denotes an application identifier for a subscribed event.

Packet filter denotes an Ethernet filter, an IPv4filter, an IPv6 filter, or the like for a subscribed event.

Expiry denotes an implied end time of the subscription request, and the UPF may not provide a notification service after expiry.

| EventSubscription | |
|---|---|
| Attribute | Explanation |
| event | UpfEvent |

There may be several events to subscribe to.

| UpfEvent | |
|---|---|
| Attribute | Explanation |
| AC_TY_CH | Change of access method |
| PDU_SES_REL | Release of PDU session |
| Qos monitor | Request for performance measurement |
| Usage report | Request for report on usage measurement |

Modification of an access method, release of a PDU session, QoS monitoring, usage measurement (usage report), etc. may be included.

QoS monitoring or usage report may include more diverse and specific information. QoS monitoring may include, as delay measurement, measurement of delay for a GTP-U path, delay for a QoS flow, or jitter for a QoS flow. Regarding delay measurement, each of the uplink/downlink/both of a GTP-U path is measured, each of the uplink/downlink/both of a QoS flow is measured, and it may be requested that a report is given when delay is periodic or a predetermined threshold or higher. Regarding jitter measurement, the uplink/downlink QoS flow is measured, and it may be requested that a report is given when jitter is periodic or a predetermined threshold or higher.

Regarding a usage request, it may be also requested that a report is given when the usage is a threshold of a predetermined amount or larger, or a threshold of a predetermined time or longer.

| NupfEventExposureNotification | |
|---|---|
| Attribute | Explanation |
| NotifId | Notification correlation ID |
| EventNotification | Details of event of which notification is given |

When a UPF provides a notification service, which subscription request the notification service corresponds to may be distinguished with notifId.

| EventNotification | |
|---|---|
| Attribute | Explanation |
| event | Notification event details |
| Timestamp | Notification time |
| timeDuration | Measurement time period |
| accType | Access type |
| UEID | ID of UE (using SUPI, GPSI, etc.) |
| pduSeId | PDU Session ID = PduSessionID |
| upSeId | Session ID of Upf |
| Qfi | Qfi for which delay or jitter has been measured |
| dnn | Data network name of event |
| snssai | Network slice identifier of event |
| Application id | Application identifier of event |
| Packet filter | Filter that has detected QoS flow of event |
| 5qi | 5qi for which delay or jitter has been measured |
| Delays | UL/DL/RT delay |
| Jitters | UL/DL jitter |
| Usage report | Report on usage |

Event denotes what event the notification informs of, and timestamp may denote the time of the notification.

accType may denote a state of access to an access network, pduSeId may be a pdusession ID, an identifier assigned by a UE, and upSeId may be a session identifier of a UPF. Delays and Jitters denote uplink/downlink/both delay time and uplink/downlink jitter, respectively. Each value may be transmitted as it is or may be expressed as statistical data collected for a predetermined time. Usage report may denote a report on usage of a UE or session for which a report has been requested.

Figure 16:
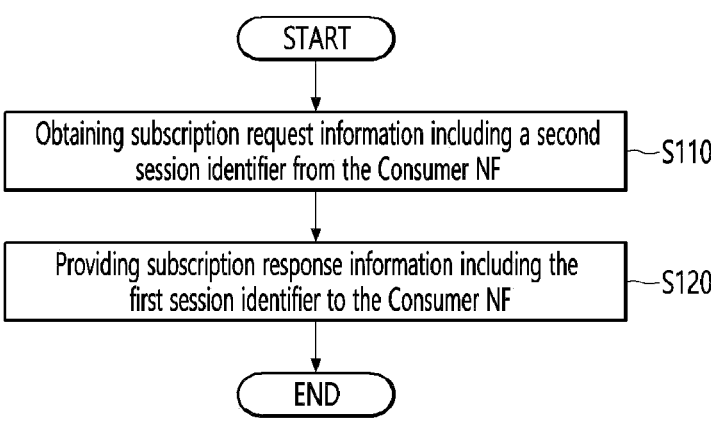
FIG. 16 is a flowchart illustrating an operation of a UPF according to an embodiment of the present disclosure.

FIG. 16 is a flowchart illustrating an operation in which a UPF receives a request for subscription, according to an embodiment of the present disclosure.

In step S110, the UPF apparatus obtains a subscription request message including the first session identifier from the NF. Here, NF may mean consumer NF.

The first session identifier may include a user session identifier, which is a session identifier for a user terminal. The first session identifier may further include a session identifier (e.g., cpSeId) assigned by the SMF during session establishment.

The subscription request message may be a message related to subscription request information, and the subscription request information may be information related to any one of a session establishment request message, a session change request message, and a session release request message.

When the subscription request is made, the session identifier may be included in the first session identifier and may be transmitted with the user session identifier from a consumer NF to the UPF.

Herein, the user session identifier may include, for example, PduSessionID and UEID. The user session identifier may include an identifier of a user or user terminal, or a session identifier assigned by a user terminal, or both.

In step S120, the UPF apparatus provides a subscription response message that corresponds to a subscription request message from the consumer NF and includes a second session identifier.

The subscription response message may be a message related to subscription response information, and the subscription response information may be information related to any one of a session establishment response message, a session change response message, and a session release response message. For example, the subscription response message may correspond to the Nupf_EventExposure_Subscribe Response of FIG. 7.

The second session identifier may include a session identifier (upSeId) assigned by the UPF during session establishment. Herein, the user session identifier may include PduSessionID and UEID.

Figure 17:
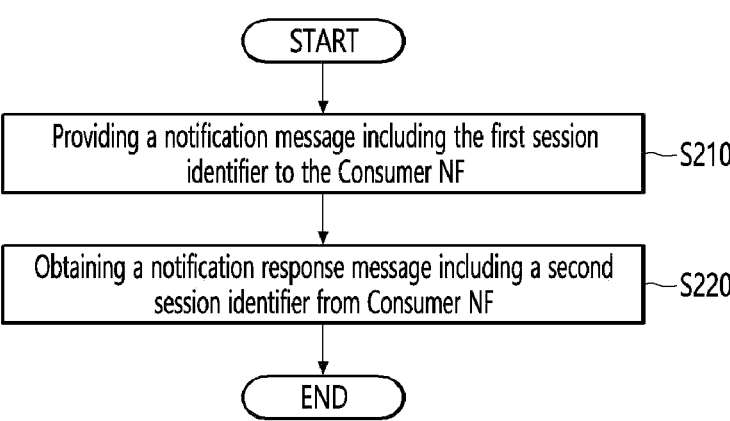
FIG. 17 is a flowchart illustrating an operation of an SMF according to an embodiment of the present disclosure.

FIG. 17 is a flowchart illustrating an operation in which a UPF provides a notification service, according to an embodiment of the present disclosure.

Each step of FIG. 17 may be understood as performing an operation corresponding the request shown in FIG. 16. Accordingly, a first session identifier, a second session identifier, and a user session identifier may be understood as having the same meaning as those of FIG. 16.

Referring to FIG. 17, in step S210, a UPF apparatus provides a consumer NF with a notification message including a first session identifier. In step S220, the UPF obtains a notification response message that corresponds to the notification message and includes a second session identifier from the consumer NF.

Specific embodiments for implementing the present disclosure have been described. The present disclosure may include the above-described embodiments as well as embodiments simply changed in design or easily changed. In addition, the present disclosure may also include techniques easily modified using the embodiments and implemented. Therefore, the scope of the present disclosure should not be defined as being limited to the embodiments, but should be defined by the appended claims and equivalents thereof.

What is claimed is:

1. An operation method of a user plane function (UPF) in a wireless communication system, the operation method comprising:

obtaining a subscription request message from a network function (NF), the subscription request message including a first identifier, notification uniform resource locator (URI) information (notifUri), and event subscription information (eventSubs); and providing the NF with a subscription response message corresponding to the subscription request message, the subscription response message including a second identifier, wherein the first identifier includes a user plane session identifier (upSeId) assigned by the UPF, or a user session identifier that is a session identifier for a user terminal, or both, wherein the second identifier includes a control plane session identifier (cpSeId) assigned by a session management function (SMF), or the user session identifier or both, and wherein the eventSubs includes at least one event related to measurement data generated by the UPF, wherein the measurement data is related to a performance of user traffic and a usage measurement.

2. The operation method of claim 1, wherein the user session identifier includes at least one selected from a group of an identifier (UEID) of the user terminal, a session identifier (PduSessionID) assigned by the user terminal, a Media Access Control (MAC) address, an Internet Protocol version 4 (IPv4) address, or an Internet Protocol version 6 (IPv6) address.

3. The operation method of claim 2, wherein the UEID represents a user or the user terminal by using a network access identifier (NAI), an international mobile subscriber identity (IMSI), a mobile station integrated system digital network (MSISDN), a subscription permanent identifier (SUPI), a generic public subscription identifier (GPSI), an international mobile equipment identity (IMEI), and a permanent equipment identifier (PEI).

4. The operation method of claim 1, wherein the subscription request message is a session establishment request message, a session modification request message, or a session release request message.

5. The operation method of claim 1, wherein the subscription response message is a session establishment response message, a session modification response message, or a session release response message.

6. The operation method of claim 1, wherein the subscription request message or the subscription response message or both further include at least one selected from a group of a subscription identifier (subId), a notification correlation identifier (notifId), a notification uniform resource locator (notifUri), event subscription information (eventSubs), a Quality of Service (QoS) flow identifier (Qfi), a Data Network Name (dnn), Single Network Slice Selection Assistance Information (snssai), Application id, a Packet filter, or Expiry.

7. An operation method of a user plane function (UPF) in a wireless communication system, the operation method comprising:

providing a network function (NF) with a notification message including a second identifier, a notification correlation identifier (NotifId), and a notification event (event); and obtaining, from the NF, a notification response message corresponding to the notification message, the notification response message including a first identifier, wherein the first identifier includes a user plane session identifier (upSeId) assigned by the UPF, or a user session identifier that is a session identifier for a user termina, or both, and wherein the second identifier includes a control plane session identifier (cpSeId) assigned by a session management function (SMF), or the user session identifier or both, and wherein the eventSubs includes at least one event related to measurement data generated by the UPF, wherein the measurement data is related to a performance of user traffic and a usage measurement.

8. The operation method of claim 7, wherein the notification message further includes at least one selected from a group of a notification correlation identifier (NotifId), a notification event, a Timestamp, a timeDuration, an access type (accType), an identifier of the user terminal (UEID), a protocol data unit session identifier (pduSeId), a user plane session identifier (upSeId), a Quality of Service (QoS) flow identifier (Qfi), Data Network Name (dnn), Single Network Slice Selection Assistance Information (snssai), Application id, a Packet filter, 5G QoS Indicator (5qi), Delays, Jitters, or a Usage report.

9. The operation method of claim 7, wherein the user session identifier includes at least one selected from a group of an identifier (UEID) of the user terminal, a session identifier (PduSessionID) assigned by the user terminal, a Media Access Control (MAC) address, an Internet Protocol version 4 (IPv4) address, or an Internet Protocol version 6 (IPv6) address.

10. The operation method of claim 9, wherein the UEID represents a user or the user terminal by using a network access identifier (NAI), an international mobile subscriber identity (IMSI), a mobile station integrated system digital network (MSISDN), a subscription permanent identifier (SUPI), a generic public subscription identifier (GPSI), an international mobile equipment identity (IMEI), and a permanent equipment identifier (PEI).

11. An apparatus for a user plane function (UPF) in a wireless communication system, the apparatus comprising:

a transceiver; and at least one controller operably connected to the transceiver, wherein the at least one controller is configured to:

obtain a subscription request message from a network function (NF), the subscription request message including a first identifier, notification uniform resource locator (URI) information (notifUri), and event subscription information (eventSubs), and provide the NF with a subscription response message corresponding to the subscription request message, the subscription response message including a second identifier, wherein the first identifier includes a user plane session identifier (upSeId) assigned by the UPF, or a user session identifier that is a session identifier for a user terminal, or both, wherein the second identifier includes a control plane session identifier (cpSeId) assigned by a session management function (SMF), or the user session identifier or both, and wherein the eventSubs includes at least one event related to measurement data generated by the UPF, wherein the measurement data is related to a performance of user traffic and a usage measurement.

12. The apparatus of claim 11, wherein the user session identifier includes at least one selected from a group of an identifier (UEID) of the user terminal, a session identifier (PduSessionID) assigned by the user terminal, a Media Access Control (MAC) address, an Internet Protocol version 4 (IPv4) address, or an Internet Protocol version 6 (IPv6) address.

13. The apparatus of claim 12, wherein the UEID represents a user or the user terminal by using a network access identifier (NAI), an international mobile subscriber identity (IMSI), a mobile station integrated system digital network (MSISDN), a subscription permanent identifier (SUPI), a generic public subscription identifier (GPSI), an international mobile equipment identity (IMEI), and a permanent equipment identifier (PEI).

14. The apparatus of claim 11, wherein the subscription request message is a session establishment request message, a session modification request message, or a session release request message.

15. The apparatus of claim 11, wherein the subscription response message is a session establishment response message, a session modification response message, or a session release response message.

16. The apparatus of claim 11, wherein the subscription request message or the subscription response message or both further include at least one selected from a group of a subscription identifier (subId), a notification correlation identifier (notifId), a notification uniform resource locator (notifUri), event subscription information (eventSubs), a Quality of Service (QoS) flow identifier (Qfi), a Data Network Name (dnn), Single Network Slice Selection Assistance Information (snssai), Application id, a Packet filter, or Expiry.

* * * * *